(12) United States Patent
Gupta (10) Patent No.: US 10,477,783 B2
(45) Date of Patent: Nov. 19, 2019

(54) ENVIRONMENT CONTROLLED MULTI SPAN STRUCTURED GREEN HOUSES FOR COST EFFECTIVE FOOD PRODUCTION

(71) Applicant: Sat Parkash Gupta, Chandigarh (IN)

(72) Inventor: Sat Parkash Gupta, Chandigarh (IN)

(*) Notice: Subject to any disclaimer, the term of this patent is extended or adjusted under 35 U.S.C. 154(b) by 131 days.

(21) Appl. No.: 14/426,501

(22) PCT Filed: Dec. 19, 2012

(86) PCT No.: PCT/IN2012/000830
§ 371 (c)(1),
(2) Date: Mar. 6, 2015

(87) PCT Pub. No.: WO2014/037958
PCT Pub. Date: Mar. 13, 2014

(65) Prior Publication Data
US 2015/0237812 A1    Aug. 27, 2015

(30) Foreign Application Priority Data
Sep. 6, 2012    (IN) .......................... 2779/DEL/2012

(51) Int. Cl.
*A01G 9/18*    (2006.01)
*A01G 9/14*    (2006.01)
*A01G 9/22*    (2006.01)
*A01G 9/24*    (2006.01)

(52) U.S. Cl.
CPC .................. *A01G 9/14* (2013.01); *A01G 9/18* (2013.01); *A01G 9/227* (2013.01); *A01G 9/24* (2013.01); *A01G 9/246* (2013.01); *A01G 9/247* (2013.01); *Y02A 40/268* (2018.01)

(58) Field of Classification Search
CPC ............... A01G 9/14; A01G 9/18; A01G 9/24
See application file for complete search history.

(56) References Cited

U.S. PATENT DOCUMENTS

| 4,195,441 | A | * | 4/1980 | Baldwin | ................ | A01G 9/243 47/17 |
| 5,713,154 | A | * | 2/1998 | Goldstein | ................ | A01G 9/18 47/17 |
| 2011/0041395 | A1 | | 2/2011 | Newbold et al. | ................ | 47/1.4 |

FOREIGN PATENT DOCUMENTS

| AU | 2006202086 | 5/2006 | ............... A01G 9/18 |
| DE | 2515363 A1 | 10/1976 | ............... A01G 9/24 |

* cited by examiner

*Primary Examiner* — Kristen C Hayes
(74) *Attorney, Agent, or Firm* — The Dobrusin Law Firm, PC (57) ABSTRACT

The present invention relates to the environment controlled multi span structured greenhouses equipped with the modules Z1 to Z7 and plurality of sensors. Z1 comprises a capture manifold, a compressor, tanks T1, T2, Ta, and a release manifold, Z2 comprises an earth tube heat exchanger for very low cost heating and cooling of greenhouses in respective cold and hot locations, substantially reducing fossil fuel use, Z3 maintains greenhouse air relative humidity at a defined set point, Z4 harnesses bio-thermal energy, Z5 reduces global warming by preventing greenhouse carbon dioxide from being released into atmospheres, Z6 uses activated nutrients solutions substantially reducing input cost in drip and foliar dozing, Z7 comprises a film fixed to the greenhouse roof and to the four external sides' and automated 0 to 100% roll on and roll off thermal shading curtains wherein the greenhouse does not comprise gutters.

4 Claims, 3 Drawing Sheets

ENVIRONMENT CONTROLLED MULTI SPAN STRUCTURED GREEN HOUSES FOR COST EFFECTIVE FOOD PRODUCTION

This is a national phase application of International PCT application No. PCT/IN2012/000830.

FIELD OF THE INVENTION

The present invention relates to the environment generally and, more particularly, controlled structured greenhouses for cost effective food production.

BACKGROUND OF THE INVENTION

Conventional greenhouses suffer from numerous problems of which so far no tangible solutions exist and as such cost effective food production cannot be achieved using conventional greenhouses.

In conventional greenhouses, it is difficult to maintain in the greenhouse the air relative humidity at a defined relative humidity point independent of the greenhouse air temperature defined temperature point. In this regard, water molecules evaporate into the greenhouse air until equilibrium is reached. If the greenhouse air temperature increases, then the greenhouse air expands and can hold more water and thus the greenhouse air relative humidity reduces. Conversely, if the greenhouse air temperature decreases, the greenhouse air contracts and can hold less water. As long as water does not condense out of the greenhouse air, the greenhouse air relative humidity increases. With any further temperature decrease, the concentration of water in the greenhouse air rises above the saturation point and condenses, dew point forming large drops of water on the interior surfaces of the greenhouse cover film and on the interior surfaces of the gutters which drip on to plants and may cause injury. Condensation also reduces light transmission into the greenhouse.

Several foliar diseases are directly related to the greenhouse air high relative humidity, especially *Botrytis* and Powdery mildew. Powdery mildew spores germinate best at 95% or higher greenhouse air relative humidity.

Another problem in conventional greenhouses is mist. A very fine continuous layer of moisture, which can form on the interior surfaces of the greenhouse cover film during cold early mornings, when the greenhouse air temperature decreases and the greenhouse air relative humidity reaches saturation point. A dense fog can form in the greenhouse which also reduces sunlight transmission into the greenhouse.

It is difficult to maintain the greenhouse at a defined temperature point, particularly in hot locations wherein so far there is no option to use a fan/pad or a fogger evaporative cooling system which increases the greenhouse air relative humidity. The defined temperature point cannot be controlled and maintained because the higher the greenhouse air relative humidity the less effective is evaporative cooling. Furthermore, supplementary cooling cost in hot locations is very high.

Also, in cold locations, there is a high cost associated with greenhouse supplementary heating, induced mostly by burning fossil fuel, which emits substantial air pollutants, which contribute to global warming.

Due to the fact that during dark hours, plants release carbon dioxide and are in need of an oxygen rich environment to rejuvenate the health of the plants, and to maximize tolerance of the plants to disease and the like.

Due to carbon dioxide released by the plants during dark hours, or due to residual carbon dioxide available after the carbon dioxide enrichment, events of the sunlight hours the carbon dioxide content in the greenhouse are much higher than desired (compared to a defined carbon dioxide content point). Traditionally, greenhouse excess carbon dioxide content is released into the atmosphere, which contributes to global warming and also incurs a cost in relation to carbon credits.

Another problem with conventional greenhouses is that the air relative humidity, the air temperature and carbon dioxide content in the greenhouse vary due to horizontal and vertical gradients and hot or cold pockets are formed therein. This is further augmented by moisture production of the plants which is driven by leaf temperature of the plants and the greenhouse air vapor pressure deficit.

In conventional greenhouses, during winter, horizontal air fans are run continuously to improve the greenhouse air relative humidity and the greenhouse air temperature uniformity, and to prevent hot or cold pockets from being formed. However, the cost benefit is minimal.

The intensity of solar radiation all over the world, at ground level, is unevenly distributed. This is due to variables such as solar altitude, which is associated with the latitude, seasons, atmospheric conditions, cloud coverage, degree of pollution and elevation above sea level.

Climatic conditions are characterized by either low or high atmospheric air temperature during winter and summer.

In the conventional greenhouses, a thermal screen may be installed at the interior level of the gutters for retaining heat, for reducing heat loss from the greenhouse and the associated thermal energy cost. However, it is difficult to maintain an air tight thermal screen for reducing heat loss from below the thermal screen to above the thermal screen. Furthermore, during snow storms, the thermal screen is switched-off to allow the heat below the thermal screen to reach the greenhouse ceiling in order to melt snow. The sudden exposure of the plants to the cold environment, which until then were in a suitably warm environment, can be detrimental to the health of the plants. Furthermore, this method of melting snow is not adequate.

In many conventional greenhouses, in cold locations, a double layer inflated film is used for covering the greenhouse for reducing heating cost. However, it is difficult to maintain optimal insulation between the two layers of inflated film which is critical for increased heating efficiency in order to minimize heat loss and thermal energy cost. Another problem associated with such greenhouse cover film is isolating leaking holes. In hot locations separate shading curtains may need to be used during the sunlight hours for reducing a) Greenhouse air temperature
b) Unwanted heat gain, and
c) Greenhouse supplementary cooling cost.

So far no cost effective tangible solutions exist to control the daily light photoperiod, which is a vital factor influencing the growth of a plant. Plants that are grown in conditions of varying daily light photoperiod patterns cannot settle into a regular life cycle and tend to grow poorly.

Another problem with conventional greenhouses is that of gutter connected multi span structured greenhouses. It is unviable to install gutters of adequate volume to handle very heavy downpours of rain in multi span structured greenhouses.

Heavy downpours of rain often overflows the roofs, along the sides and into the multi span structured greenhouses which can damage crops. There are further problems related to gutters such as blocking incoming sunlight into the greenhouse, condensation or mist on the interior surfaces of the gutters and snow accumulation in the gutters.

Another problem is snow accumulation on the exterior surfaces of the film covering the greenhouse roof and the four external sides of the greenhouse.

Yet another problem is dust and dirt accumulation on the exterior surfaces of the film covering the greenhouse roof and the four external sides of the greenhouse and in the gutters which also promotes growth of fungi and algae because the dust and dirt serve as soil and mineral elements.

Dust, dirt and the like cause a substantial reduction in the transmitted solar radiation into the greenhouse. Within a few weeks after installation, the dust and dirt can render the greenhouse cover film almost opaque rather than transparent, which substantially reduces light transmission into the greenhouse.

Another problem is that of fire hazards which may occur because of highly inflammable greenhouse cover film, curtains, insect nettings, screens and the like.

Yet another problem is food production in cold locations, wherein life exists but is very sunlight deficient.

Another problem in existing greenhouses is the very high capital cost, labor intensive requirements, use and maintenance of complicated equipment and component. Further to this, the following must be completed:
i) Mixing, activating and drip dosing a drip dosing a activated nutrient solution,
ii) Mixing and drip dosing a drip dosing a crop treatment solution,
iii) Warming i),ii) solutions to a defined temperature in order to maintain temperature of the roots of the crop at a defined temperature point,
iv) Mixing, activating and foliar dosing a foliar dosing activated nutrient solution,
v) Mixing and a foliar dosing a foliar dosing crop treatment solution,
vi) Warming iv), v) solutions to a defined temperature equal to the greenhouse air temperature,
vii) Greenhouse evaporative cooling in hot locations,
viii) Greenhouse humidification in hot locations,
ix) Dust and/or dirt wash off from exterior surfaces of the film covering the greenhouse roof and the four external sides, and
x) Firefighting.

Also, as of now, for roll-on and roll-off curtains and screens very high cost large wall thickness C-class, large diameter galvanized iron pipes are used to keep the curtains and screens and the like weighted down to retain them tightly in place, and to prevent them from blowing in the wind. Such solutions are very expensive.

Basic needs to overcome the problems of conventional greenhouses for cost effective food production are:
1) Substantial reduction in capital and operating costs of a greenhouse,
2) Maintaining the greenhouse air relative humidity at a defined relative humidity point,
3) Maintaining the greenhouse air temperature at a defined temperature point,
4) Preventing greenhouse carbon dioxide from being released into the atmosphere, the carbon dioxide released by the plants during dark hours and/or the residual carbon dioxide available after the carbon dioxide enrichment events of sunlight hours, which otherwise contributes to global warming and incurs a cost in relation to carbon credits,
5) Maintaining in the greenhouse the carbon dioxide content at a defined carbon dioxide content point,
6) Providing an oxygen rich environment during dark hours to rejuvenate the health of a plant and to maximizes tolerance of the plants to disease and the like,
7) Reducing use and thus the cost of nutrients, pH adjustments agents and of crop protection agents,
8) Minimizing greenhouse supplementary heating and cooling cost in respective cold and hot locations,
9) Sourcing a cost effective material to serve as a thermal and shading for "an all in one solution for all seasons and in all locations",
10) Increasing the deficient sunlight energy together with or without artificial lighting energy into the greenhouse to be sufficient for food production,
11) Stopping heavy downpour of rain overflowing on the roofs, along the sides and into the multi span structured greenhouses,
12) Reducing the dust and dirt accumulation on the exterior surfaces of the film covering the greenhouse roof and the four external sides of the greenhouse which will lead to an increase in the light transmission into the greenhouse,
13) Providing an efficient method to combat fire hazards which may occur because of highly inflammable greenhouse cover film, curtains, insect netting, screens and the like,
14) Facilitating melting of snow on the exterior surfaces of the film covering the greenhouse roof and the four external sides of the greenhouse,
15) Facilitating crop root zone aeration and maintaining the crop root zone temperature at a defined temperature point,
16) Facilitating low cost integrated pest management,
17) Obviating ventilation need for maintaining the carbon dioxide and oxygen balance during winters, rain and snow when conventional greenhouses are maintained closed,
18) Facilitating food production in a greenhouse in cold locations, wherein life exists but is very sunlight deficient and wherein food production even in a greenhouses has not so far been achieved, and
19) Reducing the cost of galvanized iron pipes that are used for weighing down roll-on and roll-off curtains and screens to retain them tightly in the place and to prevent them from blowing in the wind.

OBJECTS OF THE INVENTION

One problem addressed is the very high and ever rising prices of fossil fuel. A substantial portion of the global total area excluding the oceans are colder locations wherein heating of the greenhouses needs burning substantial amounts of fossil fuels. This also emits substantial amounts of atmospheric pollutants, most of which contribute to global warming. If heating of the greenhouses can be enabled by some other cost effective means, then fossil fuel use would be drastically reduced.

The present invention provides innovative solution to reduce the use of fossil fuel by enabling heating of the greenhouses by providing an earth tube heat exchanger. The following illustrates an example of an earth tube exchanger funda that may be used with the present invention. In general, with soil strata between 2-3 meters depth, a temperature regime is constant (thermal constant).

Earth Tube Heat Exchanger Fundamental
Soil strata between 2-3 mtr depth
Temp regime is constant (thermal constant)
Temp in this strata displays no diurnal fluctuation
It does display annual fluctuation but amplitude is small
At Ahemdabad India 23. 03° N Lat
Average Thermal Constant 27° C.
Sharan & Jhadav: 2002

The use of earth tube heat exchanger substantially reduces the greenhouse supplementary heating cost in the cold locations and the greenhouse supplementary cooling cost in the hot locations, by conditioning cooler greenhouse air to warmer temperatures in the cold locations and by conditioning warmer greenhouse air to cooler temperatures in the hot locations maintaining the greenhouse air temperature equal to the average thermal constant temperature of the location.

Before installation of an earth tube heat exchanger, the soil strata depth can be measured wherein the most suitable average thermal constant temperature of a location can be found.

Another low cost means is bio-thermal energy which involves low investment cost over other renewable energy sources. Furthermore, bio-thermal energy does not depend upon energy markets, and only relies on providing a bio-thermal energy harnessing automated equipment. Harnessing bio thermal energy also coproduces carbon dioxide which is used for enrichment during the sun light hours for maximizing the productivity.

Another problem addressed by the present invention is carbon dioxide released by the plants during dark hours or due to the residual carbon dioxide available after carbon dioxide enrichment events of the sunlight hours. The excess carbon content in the greenhouse can be much higher than a desired and a defined carbon dioxide content point. Traditionally, greenhouse excess carbon dioxide is released into the atmosphere which contributes to global warming and also incurs a cost in relation to carbon credits.

Similarly, industrial co-produced carbon dioxide also escapes into the atmosphere, which also contributes to global warming.

The present invention may offer a tangible method and/or apparatus to alleviate global warming by preventing the greenhouse carbon dioxide from being released into the atmosphere; by capturing, compressing, dehumidifying, storing and utilizing the greenhouse carbon dioxide for enrichment during the sunlight hours for maximizing the productivity of the plants. This results in very low cost food production.

The present invention also alleviates global warming by preventing the industrial co-produced carbon dioxide from escaping into the atmosphere by using a compressor with the manifold inlets that are positioned around carbon dioxide co-producing sources.

The delivery pipes of the compressors are installed in a very deep water bores, which are tightly filled with thick soil and sealed. This maintains the carbon dioxide dissolved in water which may be converted into hydrocarbons in due course.

Another problem addressed by the present invention is that land on earth planet is limited, yet the population continues to increase. In a world with a burgeoning population, the fight against hunger and famine cannot be over emphasized.

Apart from food security, another graver problem is the cost of food production which is rising fast due to high and increasing costs of inputs. Therefore, in the coming decades, even if food is available, most of the population of the world (particularly in the undeveloped and the developing countries) will not be able to afford such food and will starve. As such, it is essential to search for innovative solutions for low cost food production.

The present invention may offer a tangible method and/or apparatus for reducing the cost of food production:
1) Food Production in a Greenhouse
   i) Providing an environmentally friendly, extremely efficient greenhouse for very cost effective food production that addresses various problems with conventional greenhouses. These solutions can be retrofitted into existing greenhouses so that low cost food production can be facilitated.
   ii) Very substantially reducing the greenhouse supplementary heating cost in the cold locations and the greenhouse supplementary cooling cost in the hot locations which can be achieved by:
      a) Providing a low cost earth tube heat exchanger which maintains greenhouse air temperature equal to the thermal constant temperature of the location.
      b) Providing 0-100% roll-on-close and roll-off-open automated thermal and shading curtains on the greenhouse ceiling and on the four internal sides of the greenhouse for maximizing heat gain, sensible and latent, for minimizing the greenhouse supplementary heating cost in the colder locations and for minimizing unwanted heat gain for minimizing the greenhouse supplementary cooling cost in the hot locations.
      c) Providing an automated equipment for harnessing bio-thermal energy for further supplementary heating of the greenhouses in the colder locations after the earth tube heat exchanger has maintained the greenhouse air temperature equal to the thermal constant temperature of the location. This equipment also serves numerous other needs for hot air and also provides carbon dioxide which is used for carbon dioxide enrichment during sun light hours for maximizing the productivity and also provides high quality sterilized compost.
   iii) Facilitating food production in a greenhouse in the cold locations where life exists but is very deficient sunlight energy and wherein food production even in a greenhouse has not so far been realized. Food production is facilitated by increasing deficient sunlight together with artificial light by using an earth tube heat exchanger together with a bio-thermal energy harnessing automated equipment.
2) Optimizing the Productivity by
   a) Utilizing the greenhouse carbon dioxide for carbon dioxide enrichment during sunlight hours,
   b) Facilitating in the hot locations, the carbon dioxide enrichment during sunlight hours,
   c) Increasing sunlight energy together with or without artificial lighting energy to be sufficient for food production,
   d) Providing low cost artificial lighting during the dark hours for maximizing the photoperiod,
   e) Using growing media beds wherein productivity is much higher and all benefits of the bags can be realized at much lower cost,
   f) Maintaining the temperature of the roots of the crops at a defined temperature point which facilitates efficient uptake of nutrients, and
   g) Maximizing pollination of plants (like tomatoes, bell peppers, and the like). Pollination is directly linked to the productivity. During the pollination hours, release pressure of the release manifold is suitably increased.

3) Minimizing Use and Cost of Crop Protection Agents and Cost of Sprayers by
 a) Rejuvenating health of plants and maximizing the resistance of plants to diseases organisms, bacteria, pathogens, fungi, viral infection, harmful insect pests and the like, by releasing into the greenhouse oxygen rich greenhouse air during dark hours,
 b) Facilitating integrated pest management by the greenhouse efficiently preventing ingress of pathogens, harmful insect pests and the like into the greenhouse for efficient biological control, and
 c) Facilitating maintaining the greenhouse air relative humidity at about 80% which helps in minimizing the pressure of disease and the like.

4) General Cost Savings
 a) Facilitating a more economically viable greenhouse by selling the carbon credits which are not used because the greenhouse carbon dioxide is prevented from being released into the atmosphere,
 b) Facilitating realization of all the benefits of a tall greenhouse in a shorter greenhouse leading to a much more economically viable greenhouse with reduced capital cost, greater energy efficiency and reduced operating cost,
 c) Foliar dosing of activated nutrient solutions which substantially reduce operational use and input cost of nutrients, enhances their use efficiency, and eliminates the cost associated with leaching Diammonium phosphate activated solution foliar dosing during transplanting or seed drilling,
 d) Eliminating the need of horizontal air fans and there by saving their capital and operating cost, and
 e) Facilitating switching-off a drip dosing irrigation and a drip dosing fertigation event on the first few drops of drained off water or leachate for optimal watering and nutrition thus saving substantial cost of nutrients.

5) Food Production in Open Field
 i) Foliar dosing of activated nutrient solutions which substantially reduce operational use and input cost of nutrients, enhances use efficiency of nutrients, and eliminates the cost associated with leaching Diammonium phosphate activated solution foliar dosing during transplanting or seed drilling, and
 ii) All standing horticulture, food grains crops and the like to be provided artificial lighting for a total daily photo period of 16 to 22 hours, including day light hours.

A collateral benefit of the invention is a very substantial alleviation of global warming.

SUMMARY OF THE INVENTION

In a first aspect of the present invention, a greenhouse is equipped with an atmosphere weather station.

In a second aspect of the present invention, the greenhouse is equipped with a basic module Z1 which comprises a capture manifold, a compressor, two dehumidifying tanks T1 and T2, a release manifold and a tank Ta. The capture manifold captures from above a plant carbon dioxide rich greenhouse air during dark hours and oxygen rich greenhouse air during sunlight hours. The captured greenhouse air is compressed, and released into the operating dehumidifying tank T1 or T2 for dehumidification or for maintaining almost dry greenhouse air in the tanks and stored in the respective first and second compartments Ec and Eo of the earth tube heat exchanger. The tank Ta stores and dehumidifies compressed atmospheric air.

The release manifold releases into the greenhouse the dehumidified carbon dioxide rich greenhouse air during the sunlight hours, and the dehumidified oxygen rich greenhouse air during the dark hours.

In a third aspect of the present invention, a module Z2 measures the average thermal constant temperature of a location by stepwise placement of a probe of a thermistor in bores of various depths commencing at about 2 meters below ground level until the most suitable average thermal constant temperature of a location is found.

The fourth aspect of the present invention is summarized as a greenhouse equipped with a cost effective material earth tube heat exchanger for conditioning greenhouse relatively cooler air to relatively warmer in cold locations and for conditioning relatively warmer greenhouse air to relatively cooler in hot locations.

The greenhouse is equipped with the module Z2 which further comprises an earth tube heat exchanger and a greenhouse air temperature sensor which functions with the capture manifold, the compressor, the dehumidifying tanks T1 and T2 and the release manifold of the module Z1. The module Z2 conditions cooler greenhouse air to warmer temperatures in the cold locations and conditions warmer greenhouse air to cooler temperatures in the hot locations.

In a fifth aspect of the present invention, the greenhouse is equipped with a module Z3 which comprises a greenhouse air relative humidity sensor and functions with the components of the module Z1 and the earth tube heat exchanger of the module Z2 for maintaining the greenhouse air relative humidity at a defined relative humidity point.

In a sixth aspect of the present invention, the greenhouse is equipped with a module Z4 which comprises a bio-thermal energy harnessing automated equipment and functions with the compressor of the module Z1 for pressurized air need, and with a drip dosing and water transfer pump of the module Z6 for pressurized water need for harnessing the bio-thermal energy.

In a seventh aspect of the present invention, the greenhouse is equipped with a module Z5 which comprises a greenhouse carbon dioxide sensor and functions with the components of the module Z1 and the component of the module Z2 for reducing the global warming by preventing the greenhouse carbon dioxide from being released into the atmosphere.

In an eighth aspect of the present invention, the greenhouse is equipped with a module Z6 which substantially reduces operational use and input cost of nutrients by using activated nutrient solutions.

In a ninth aspect of the present invention, the module Z6 maintains the exterior surfaces of the film covering the greenhouse roof and the four external sides of the greenhouse free from dust and dirt by attaching sprinkler manifolds to the greenhouse roof and to the four external sides of the greenhouse.

In a tenth aspect of the present invention, the module Z6 further comprises an efficient fire fighting system that combats fire hazards which may occur due to highly inflammable greenhouse cover film, curtains, insect nettings, screens, and the like.

On Smoke detection triggers-on all six sprinkler manifolds to throw pressurized water onto greenhouse roof, both gable sides' and both long sides' to extinguish fire at the earliest. The main benefit is minimal damage of greenhouse cover film and crop inside.

In an eleventh aspect of the present invention, the module Z6 further comprises growing media beds, wherein productivity is much higher and wherein all the benefits of the bags are realized at a much lower cost.

According to the twelfth aspect of the present invention, a greenhouse roof covers film and gutters interior surfaces heating manifold is provisioned. When atmosphere air temperature is approaching 0° C., weather station atmosphere temperature sensor triggers-on pressurized hot air injections into heating manifold to heat greenhouse roof cover film and gutters interior surfaces. The snow melts and slides off.

In the twelfth aspect of the present invention, the module Z6 further comprises a heating manifold equipped to the greenhouse. The heating manifold injects hot air onto interior surfaces of the film covering the greenhouse roof and onto gutters interior surfaces. The snow melts and slides off.

In a thirteenth aspect of the present invention, the module Z7 further comprises 0 to 100% roll-on-close and roll-off-open automated thermal and shading curtains on the greenhouse ceiling and on the four internal sides of the greenhouse which, reduce the greenhouse supplementary heating cost in cold locations and the greenhouse supplementary cooling cost in the hot locations and which also serve efficient photoperiod control.

In a fourteenth aspect of the present invention, the module Z7 increases deficient sunlight and the deficient artificial light and produces red, blue and white light.

In a fifteenth aspect of the present invention, the module Z7 facilitates food production in a greenhouse in the cold locations wherein life exists but is very deficient sunlight. Food production is facilitated by increasing deficient sunlight energy together with artificial lighting energy and using the earth tube heat exchanger together with the bio-thermal energy harnessing automated equipment.

In a sixteenth aspect of the present invention, the greenhouse efficiently prevents ingress of disease organisms, pathogens, fungi, harmful insect pests, and the like into the greenhouse. This facilitates efficient biological control.

In a seventeenth aspect of the present invention, the greenhouse is implemented without gutters. This alleviates all other problems related to the gutters.

In an eighteenth aspect of the present invention, the module Z7 maintains optimal insulation between the two layers of inflated double layer film for covering the greenhouse and also isolates leaking holes.

In a nineteenth aspect of the present invention, the module Z7 further comprises a system that employs smaller wall thickness, smaller diameter, cheaper galvanized iron pipes filled with sand, in place of large wall thickness C-class, large diameter costly galvanized iron pipes for keeping the curtains, the screens and the like weighed down for retaining them tightly in place and preventing them from blowing in the wind.

In certain embodiments, an environment controlled multi span structured greenhouse comprises a module (Z1). The module (Z1) comprises a capture manifold for capturing from above a plant (i) a carbon dioxide rich greenhouse air during dark hours, and (ii) an oxygen rich greenhouse air during sunlight hours; a compressor compresses the captured greenhouse air; a tank (T1) and a tank (T2) and a release manifold for releasing into the greenhouse at cultivation level (i) the carbon dioxide rich greenhouse air during the sunlight hours, and the oxygen rich greenhouse air during the dark hours; and a tank (Ta) that stores and dehumidifies compressed atmospheric air, for release into the greenhouse to maintain a balance between carbon dioxide and oxygen. The tank (T1) and the tank (T2) are filled up with compressed greenhouse air alternately, and both of the tank (T1) and the tank (T2) dehumidify the filled up compressed greenhouse air.

In further embodiments, the greenhouse air relative humidity is maintained at a defined relative humidity point. When the greenhouse air relative humidity is higher than a defined relative humidity point, the greenhouse air relative humidity sensor switches-on the components of the module (Z1) and the component of the module (Z2). The capture manifold captures from above the plants the carbon dioxide rich greenhouse air during dark hours, and the oxygen rich greenhouse air during sun light hours. The compressor compresses the captured greenhouse air. The compressed greenhouse air is maintained almost dry in the tanks (T1), and (T2). The almost dry carbon dioxide rich and the oxygen rich greenhouse air are stored into the respective third and fourth compartments (Ecd) and (Eod). The release manifold releases into the greenhouse at the cultivation level, the almost dry conditioned carbon dioxide rich greenhouse air already stored in the third compartment (Ecd) during the sunlight hours, and the almost dry conditioned oxygen rich greenhouse air already stored in the fourth compartment (Eod) during the dark hours until the greenhouse air relative humidity equals the defined relative humidity point. When the greenhouse air relative humidity is lower than a defined relative humidity point; the greenhouse air relative humidity sensor switches-on the fogger manifold until the greenhouse air relative humidity equals the defined relative humidity point.

In yet further embodiments, the global warming is reduced by preventing the greenhouse carbon dioxide from being released into the atmosphere; by capturing, compressing, dehumidifying, storing and utilizing the greenhouse carbon dioxide for enrichment during sunlight hours for optimizing the productivity and for maintaining the greenhouse carbon dioxide content at a defined carbon dioxide content point. When the greenhouse carbon dioxide content is higher than a defined carbon dioxide content point due to carbon dioxide released by the plants during dark hours and/or due to residual carbon dioxide available after carbon dioxide enrichment events of the sun light hours: the greenhouse carbon dioxide sensor switches-on the components of the module (Z1) and the components of a module (Z2). The capture manifold captures from above the plants, carbon dioxide rich greenhouse air. The compressor compresses the captured carbon dioxide rich greenhouse air. The compressed carbon dioxide rich greenhouse air is dehumidified in the tanks. The carbon dioxide rich dehumidified greenhouse air is stored into the first compartment (Ec); and the release manifold releases into the greenhouse at the cultivation level. The dehumidified conditioned oxygen rich greenhouse air already stored in the second compartment (Eo) until the greenhouse carbon dioxide content equals the defined carbon dioxide content point.

BRIEF DESCRIPTION OF THE FIGURES

Embodiments of the invention will be apparent from the following detailed description and the appended claims and drawings in which:

DETAILED DESCRIPTION OF THE INVENTION

As used herein, the term 'defined temperature point' can be interchangeable with the term 'defined air temperature set point'.

As used herein, the term 'defined relative humidity point' can be interchangeable with the term 'defined air relative humidity set point'.

As used herein, the term 'defined carbon dioxide content point' can be interchangeable with the term 'defined carbon dioxide content set point'.

As used herein, the term 'defined solar radiation point' can be interchangeable with the term 'defined solar radiation set point'.

According to a first embodiment of the present invention, a greenhouse is equipped with an atmospheric weather station comprising of an atmospheric solar radiation sensor, an atmospheric air temperature sensor and a rain detector.

Figure 1:
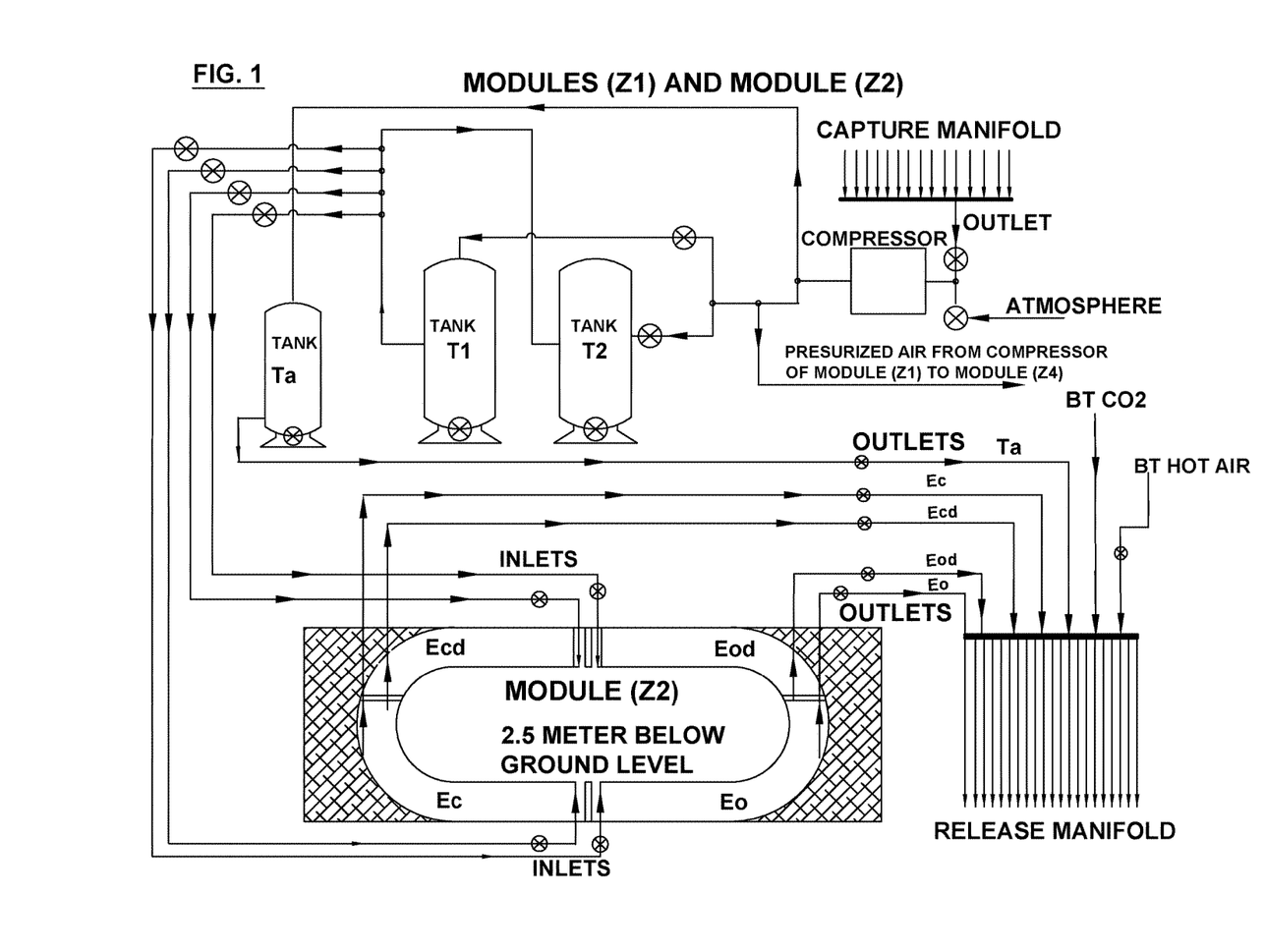
FIG. 1 is a diagram of the modules Z1 and Z2.

According to a second embodiment of the present invention, the greenhouse is equipped with a basic module Z1 which comprises a capture manifold, a compressor, two dehumidifying tanks T1 and T2, a release manifold, and a tank Ta. The capture manifold captures from above a plant carbon dioxide rich greenhouse air during dark hours and oxygen rich greenhouse air during sunlight hours. The captured greenhouse air is compressed by the compressor and released into one of the operating dehumidifying tanks T1 or T2. The greenhouse air relative humidity sensor switches-on the moisture drain off valve of the operating tank T1 or T2 for draining off moisture content for dehumidification or for draining off moisture content for maintaining almost dry greenhouse air in the tank T1 and T2. Dehumidified carbon dioxide rich greenhouse air, dehumidified oxygen rich greenhouse air, almost dry carbon dioxide rich greenhouse air and almost dry oxygen rich greenhouse air are stored into the respective first, second, third and fourth compartments Ec, Eo, Ecd and Eod of an earth tube heat exchanger.

The release manifold releases the dehumidified conditioned carbon dioxide rich greenhouse air already captured and stored in the first compartment Ec into the greenhouse at the cultivation level, during the sunlight hours. The release manifold may release the almost dry carbon dioxide rich conditioned greenhouse air already captured and stored in the third compartment Eod. During dark hours, the release manifold releases into the greenhouse the dehumidified oxygen rich (or almost dry conditioned greenhouse air) already captured and stored in the respective second or fourth compartments Eo or Eod.

The tank Ta stores compressed atmospheric air and also serves to dehumidify the stored atmospheric air. The greenhouse air relative humidity sensor maintains the compressed atmospheric air in the tank Ta as dehumidified atmospheric air or maintains almost dry atmospheric air which can be released into the greenhouse for maintaining carbon dioxide and oxygen balance. When the capture manifold is not operating, the compressor compresses the atmospheric air to maintain optimal atmospheric air stock in the tank Ta.

According to a third embodiment of the present invention, the module Z2 measures the average thermal constant temperature of a location. Placement of a probe of a thermistor into bores of different depths reveal different temperatures. The bores commence at about 2.5 meters below ground level. The bores are made by a rotary borer and have a diameter of about 2 centimeters larger than the largest dimension of the probe of the thermistor. A bottom end of a steel rod of about 2 centimeters diameter is welded with a steel plate about 2 centimeters thick and of a diameter about 2 centimeters less than the bore diameter. The steel rod is used to push the probe of the thermistor to place it at the bottom end of the bore. After placement of the probe of the thermistor, the bore is tightly filled with thick soil and sealed to insulate the probe of the thermistor from the atmosphere.

The probe of the thermistor continuously measures and records the temperature of the location until the temperature stabilizes and remains constant for a few days. This constant temperature is the average thermal constant temperature of the location. A similar calibration with the same bore and/or with new bores can be completed. Respective new bores may be located about 200 meters away from the same bore or from the preceding new bore with stepwise depth increments of about 0.5 meter based upon the average thermal constant temperature of the preceding bores until the most suitable average thermal constant temperature of the location is found.

According to a fourth embodiment of the present invention, the greenhouse is equipped with the module Z2 which further comprises an earth tube heat exchanger and a greenhouse air temperature sensor. The module Z2 functions with the capture manifold, the compressor, the dehumidifying tanks T1 and T2 and the release manifold of the module Z1 to provide (i) conditioning relatively cooler greenhouse air to relatively warmer temperatures in cold locations, (ii) conditioning relatively warmer greenhouse air to relatively cooler temperatures in hot locations and (iii) a consistent air temperature of the greenhouse equal to the average thermal constant temperature of the location.

The earth tube heat exchanger comprises four separate compartments: a first compartment Ec that stores dehumidified carbon dioxide rich greenhouse air from the tanks T1 and T2, a second compartment Eo that stores dehumidified oxygen rich greenhouse air from the tanks T1 and T2, a third compartment Ecd that stores almost dry carbon dioxide rich greenhouse air from the tanks T1 and T2, and a fourth compartment Eod that stores almost dry oxygen rich greenhouse air from the tanks T1 and T2.

The earth tube heat exchanger substantially reduces the greenhouse supplementary heating cost in cold locations, and the greenhouse supplementary cooling cost in the hot locations. It should be clear that the use of the earth tube heat exchanger results in a much more economically viable greenhouse by reducing the use and reliance upon costly conventional thermal energy sources fossil fuel in the cold locations and by using less electric power in the hot locations. This is achieved by maintaining the greenhouse air temperature equal to the average thermal constant temperature of the location.

In an example operation, when the greenhouse is installed in a cold location and the air temperature is lower than the defined temperature point, the greenhouse air temperature sensor switches-on the components of the module Z1 and the components of the module Z2. The capture manifold captures from above the plants the carbon dioxide rich greenhouse air during the dark hours and the oxygen rich greenhouse air during the sunlight hours. The captured greenhouse air is compressed and released into the operating tank T1 or T2 for dehumidification. Carbon dioxide rich dehumidified greenhouse air of the tanks T1 and T2 is stored into the first compartment Ec. Oxygen rich dehumidified greenhouse air of the tanks T1 and T2 is stored into the second compartment Eo.

The release manifold releases into the greenhouse, at cultivation level, hot air until the greenhouse air temperature equals the defined temperature point. The cultivation level defines the upper surface of the growing media in beds or bags where from the bottom portion of a stem of a plant emerges.

In an example operation when the greenhouse is located in a hot location, during sunlight hours, even after shading has been provided. If the greenhouse air temperature still remains higher than a defined temperature point, during the sunlight hours and/or during the dark hours, the greenhouse air temperature sensor switches-on the evaporative cooling system of the fogger, together with the components of the module Z1 and the components of the module Z2. The capture manifold captures from above the plants, humid stale carbon dioxide rich greenhouse air during the dark hours and the oxygen rich greenhouse air during the sunlight hours. The captured greenhouse air is compressed and released into the operating dehumidifying tank T1 or T2. The greenhouse air relative humidity sensor maintains the almost dry greenhouse air in the operating tank T1 or T2. The tanks T1 and T2 store the almost dry carbon dioxide rich greenhouse air in the third compartment Ecd. The tanks T1 and T2 store the almost dry oxygen rich greenhouse in the fourth compartment Eod.

The release manifold releases into the greenhouse at cultivation level (i) during sunlight hours the almost dry carbon dioxide rich conditioned greenhouse air already captured and stored in the third compartment Ecd, and (ii) during dark hours the almost dry oxygen rich conditioned greenhouse air already captured and stored in the fourth compartment Eod for efficient evaporative cooling until the greenhouse air temperature equals the defined temperature point.

As such, it is very easy to adjust and maintain the greenhouse air temperature at a defined temperature point which assists in significantly improving the timing of crops, especially of flowers.

Hunting (+) (−) 2.5%

By way of example, when the greenhouse air defined temperature point is 20° C., then a temperature correction event may switch-on when the greenhouse air temperature rises even to about 20.1° C. and also when the greenhouse air temperature drops even to about 19.9° C. Without the present invention, this can cause problems with almost simultaneous switch-on and switch-off temperature correction events.

In the present invention, trend logic to track and/or adjust the greenhouse air temperature rising or dropping is used. For instance, when the greenhouse air temperature rises at a rising trend, then the event would switch-on at 20.5° C. and maintain the greenhouse air temperature at 19.5° C. and vice versa. This alleviates the problem of almost simultaneous switch-on and switch-off temperature correction events.

A similar process is used for maintaining the greenhouse air relative humidity relative humidity point.

According to a fifth embodiment of the present invention, the greenhouse is equipped with the module Z3 which comprises a greenhouse air relative humidity sensor that functions with the components of the module Z1 and the component of the module Z2 to maintain the greenhouse air relative humidity at a defined relative humidity point. When the greenhouse air relative humidity is higher than the defined relative humidity point then the greenhouse air relative humidity sensor switches-on the components of the module Z1 and the component of the module Z2. The capture manifold captures the humid stale carbon dioxide rich greenhouse air during the dark hours and the oxygen rich greenhouse air during the sunlight hours. The captured greenhouse air is compressed and released into the operating dehumidifying tank T1 or T2. The greenhouse air relative humidity sensor maintains almost dry greenhouse air in the operating tank T1 or T2. The almost dry carbon dioxide rich greenhouse air of the tanks T1 and T2 is stored into the third compartment Ecd. The almost dry oxygen rich greenhouse air of the tanks T1 and T2 is stored into the fourth compartment Eod.

At the cultivation level of the greenhouse, the release manifold (i) releases into the greenhouse during the sunlight hours the almost dry carbon dioxide rich conditioned greenhouse air already captured and stored in the third compartment Ecd, and (ii) during the dark hours, the almost dry oxygen rich conditioned greenhouse air already captured and stored in the fourth compartment Eod for mixing with the greenhouse humid air until the greenhouse air relative humidity equals the defined relative humidity point.

When the greenhouse air relative humidity is lower than the defined relative humidity point, the greenhouse air relative humidity sensor switches-on the fogger manifold until the greenhouse air relative humidity equals the defined relative humidity point.

The present invention provides a method for maintaining the greenhouse air relative humidity at a defined relative humidity point, independent of the greenhouse air temperature defined temperature point.

Example Operation During Sunlight Hours

At the cultivation level of the greenhouse, the release manifold releases into the greenhouse
1) the dehumidified carbon dioxide rich conditioned greenhouse air already captured and stored in the first compartment Ec,
ii) the almost dry carbon dioxide rich conditioned greenhouse air already captured and stored in the third compartment Ecd, for maintaining:
  a) the greenhouse air relative humidity at a defined relative humidity point, independent of the greenhouse air temperature defined temperature points,
  b) the greenhouse air temperature at a defined temperature point by optimal evaporative cooling in the hot locations,
iii) additional carbon dioxide for enrichment during sunlight hours for maximizing the productivity, and
iv) the compressed atmospheric air stored in the tank Ta for maintaining the carbon dioxide and the oxygen balance in the greenhouse.

Example Operation During Dark Hours

At the cultivation level of the greenhouse, the release manifold releases into the greenhouse
i) the dehumidified oxygen rich conditioned greenhouse air already captured and stored in the second compartment Eo,
ii) the almost dry oxygen rich conditioned greenhouse air already captured and stored in the fourth compartment Eod, for maintaining:
  a) the greenhouse air relative humidity at a defined relative humidity point independent of the greenhouse air temperature defined temperature point, and
  b) the greenhouse air temperature at a defined temperature point by efficient evaporative cooling in the hot locations,
iii) hot air in the cold locations, and
iv) the compressed atmospheric air stored in the tank Ta for maintaining the carbon dioxide and the oxygen balance in the greenhouse.

The release of greenhouse air by the release manifolds into the greenhouse at the cultivation level leads to:
  i) create multiple combinations of horizontal and vertical flows, and air circulation cycles around the plants for uniform mixing of the released greenhouse air with the existing greenhouse air thus mechanizing and maximizing air circulation around the plants facilitating much higher crop density,
  ii) push up the stale greenhouse air from the cultivation level to above the plants,
  iii) obviate horizontal or vertical gradients by controlling and maintaining in the greenhouse at all vertical and horizontal locations:
    a) uniform air relative humidity at a defined relative humidity point, and
    b) uniform air temperature at a defined temperature point
  iv) obviate the need of horizontal air fans and therefore saves capital and operating cost of the horizontal fans,
  v) prevent escape into the atmosphere the stored carbon dioxide rich greenhouse air and/or the additional carbon dioxide released at the cultivation level for enrichment during sunlight hours because of being released at cultivation level is readily taken up by the plants. This saves:
    a) the cost of the carbon dioxide which could have escaped into the atmosphere, and
    b) contributed to global warming.
  vi) strengthen and harden the stems of the plants,
  vii) pollinate tomato plants, bell pepper plants and the like. To maximize pollination during the pollination hours the release pressure of the release manifold is suitably increased.

Other Benefits
  i) facilitates carbon dioxide enrichment in the hot locations also during the sunlight hours for maximizing the productivity,
  ii) creates a more economically viable greenhouse wherein instead of purchasing high cost carbon credits, substantial revenue is generated by selling the carbon credits that are not used because the greenhouse carbon dioxide is prevented from being released into the atmosphere,
  iii) minimizes pressure of disease and the like and use of crop protection agents by releasing into the greenhouse the oxygen rich greenhouse air during the dark hours, which:
    a) rejuvenates the health of the plants,
    b) maximizes the resistance of plants to diseases organisms, bacteria, pathogens, fungi, viral infection, harmful insect pests and the like,
  iv) facilitates maintaining the greenhouse air relative humidity at about 80% which helps in minimizing the pressure of diseases and the like, and
  v) achieves all the benefits of a tall greenhouse in a shorter greenhouse therefore leading to a more economically viable greenhouse with reduced capital cost, greater energy efficiency and reduced operating cost.

Figure 2:
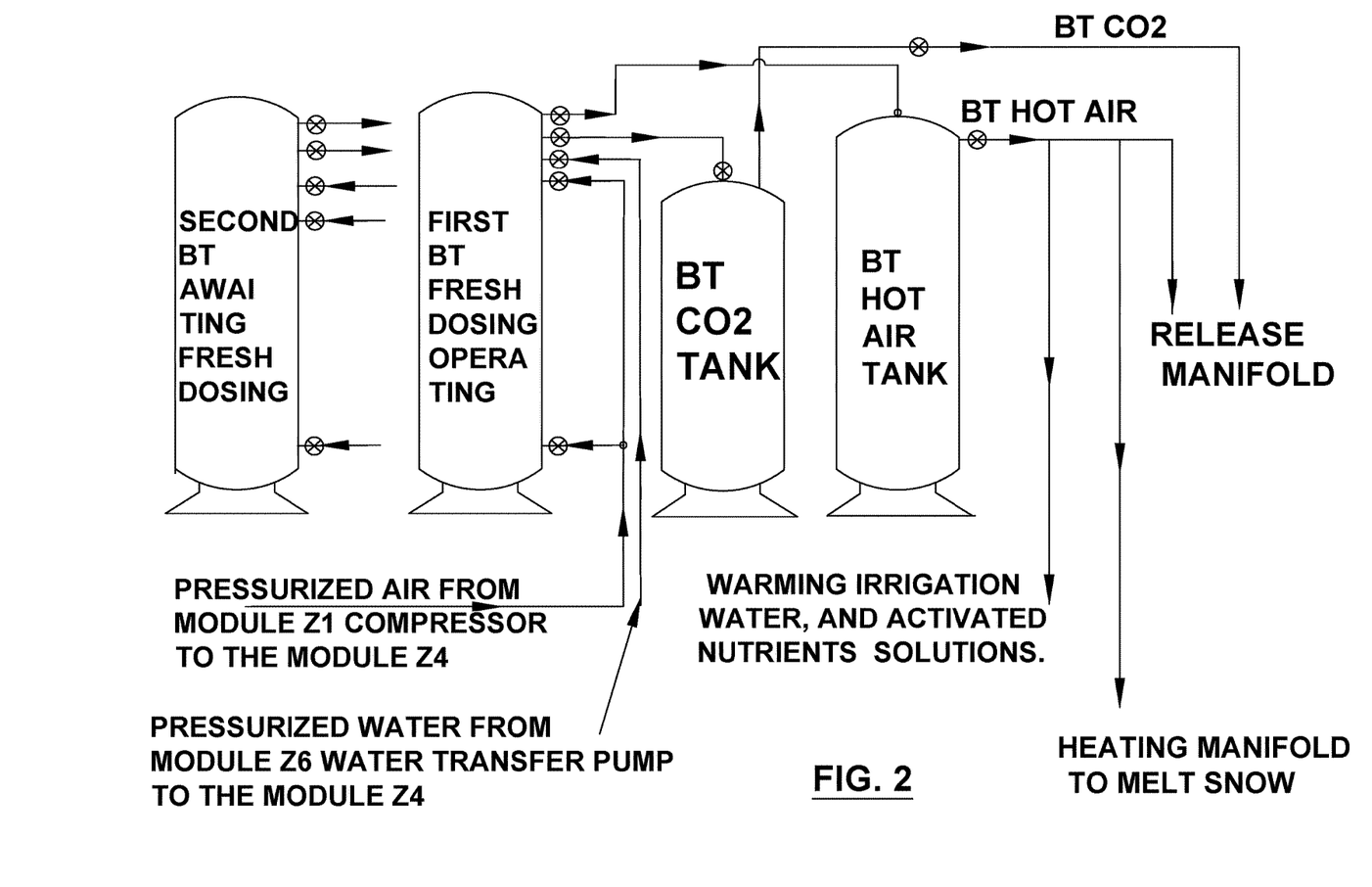
FIG. 2 is a diagram of the module Z4.
Figure 3:
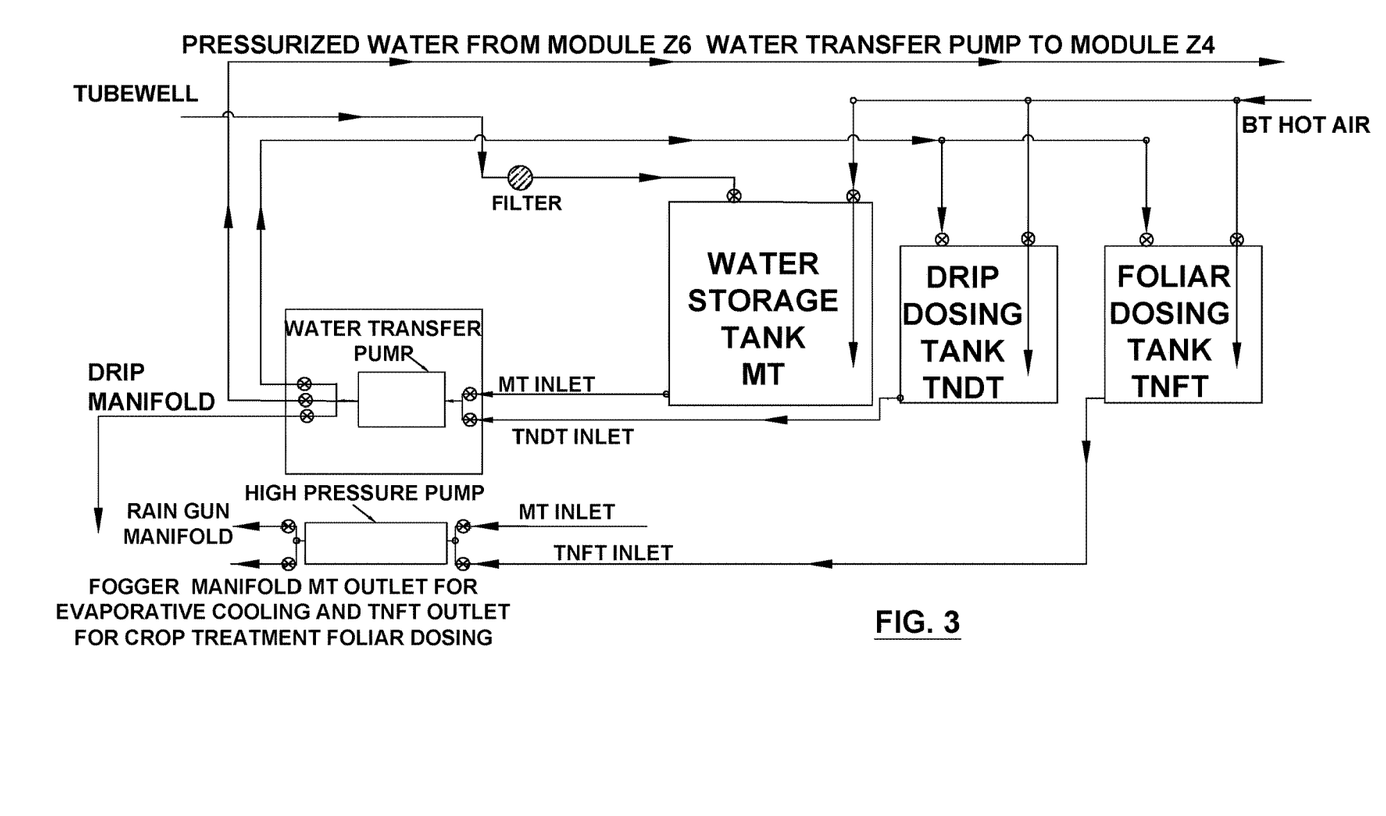
FIG. 3 is a diagram of the module Z6.

According to the sixth embodiment of the present invention, the greenhouse is equipped with a module Z4 which comprises a bio-thermal energy harnessing automated equipment that functions with the compressor of the module Z1 for the pressurized air need and with a water transfer pump of the module Z6 for the pressurized water need for harnessing bio-thermal energy for the greenhouse supplementary heating and for numerous other needs.

The module Z4 comprises two identical bio-thermal energy harnessing tanks, a first fresh dosing tank operating, a second spent dosing tank awaiting fresh dosing, a tank for storing hot air and a tank for storing carbon dioxide.

The module Z4 harnesses bio-thermal energy for various needs such as:
  i) greenhouse supplementary heating,
  ii) warming equal to a defined temperature for maintaining the temperature of the roots of the plants at a defined temperature point.
    a) drip dosing irrigation water,
    b) drip dosing activated nutrient solution,
    c) drip dosing crop treatment solution,
  iii) warming equal to the greenhouse air temperature,
    a) foliar dosing activated nutrient solution,
    b) foliar dosing crop treatment solution,
  iv) melting snow on the exterior surfaces of the film covering the greenhouse roof and in the gutters by injecting hot air onto the interior surfaces of the film covering the greenhouse roof and onto the interior surfaces of gutters.
  v) injecting pressurized hot air of a defined temperature into a root zone of plants during each drip dosing irrigation and drip dosing fertigation event.

The module Z4 provides carbon dioxide for enrichment during the sun light hours and also provides high quality sterilized compost. A module Z4 needs about 7 square meters space. In the cold locations, one or more individual modules Z4 may be placed scattered at greenhouse floor area.

According to a seventh embodiment of the present invention, the greenhouse is equipped with module Z5 which comprises a greenhouse carbon dioxide sensor and functions with the components of the module Z1 and the component of the module Z2 for reducing the global warming by preventing the greenhouse carbon dioxide from being released into the atmosphere, by capturing, compressing, dehumidifying, storing and utilizing the greenhouse carbon dioxide for enrichment during the sunlight hours for maximizing the productivity.

The module Z5 further maintains the greenhouse carbon dioxide content at a defined carbon dioxide content point.

When the greenhouse carbon dioxide content is higher than a defined carbon dioxide content point, due to the carbon dioxide released by the plants during the dark hours, or due to residual carbon dioxide available after the carbon dioxide enrichment events of the sunlight hours, then the greenhouse carbon dioxide sensor switches-on the components of the module Z1 and the component of the module Z2.

The capture manifold captures from above the plants carbon dioxide rich greenhouse air which is compressed and released into the dehumidifying operating tank T1 or T2 for dehumidification. The dehumidified carbon dioxide rich greenhouse air of the tanks T1 and T2 is stored into the first compartment Ec.

The release manifold releases into the greenhouse at the cultivation level the dehumidified oxygen rich conditioned greenhouse air already captured and stored in the second compartment Eo, until the greenhouse carbon dioxide content equals the defined carbon dioxide content point.

According to an eighth embodiment of the present invention, the greenhouse is equipped with a module Z6 which comprises a drip manifold, a drip dosing and water transfer pump, a nutrient solution mixing and activating system, a drip dosing crop treatment solution mixing system, a drip dosing irrigation and fertigation system which includes a drip dosing tank TNDT and a foliar dosing tank TNFT. The processes of mixing, activating and drip dosing a drip dosing activated nutrient solution and mixing and drip dosing a drip dosing crop treatment solution are completed in the tank TNDT. The processes of mixing, activating and foliar dosing a foliar dosing activated nutrient solution and mixing and foliar dosing a foliar dosing crop treatment solution are completed in the tank TNFT. Using activated nutrient solutions substantially reduces the operational use and the input cost of the nutrients.

According to a ninth embodiment of the present invention, the module Z6 further comprises sprinkler manifolds attached to the greenhouse roof and to both gable sides and to both long sides of the greenhouse for maintaining exterior surfaces of the film covering the greenhouse clean and free from dust and dirt. The inlets of the sprinkler manifolds are connected to an outlet of a high pressure water pump. During the defined sunlight hours, durations, and intervals based upon the dust and dirt status of a location, the atmospheric solar radiation sensor switches-on roof, gable sides and long sides sprinkler manifolds for throwing pressurized water onto exterior surfaces to wash off all the dust and dirt.

According to a tenth embodiment of the present invention, the module Z6 further comprises an efficient fire fighting system for combating fire hazards, that may occur because of highly inflammable greenhouse cover film, curtains, insect netting, screens and the like. On visual smoke detection, all six sprinkler manifolds are switched-on for throwing pressurized water onto greenhouse roof, both gable sides and both long sides to extinguish fire at the earliest. The main benefit is minimal damage to the greenhouse cover film, and the crops inside the greenhouse.

According to an eleventh embodiment of the present invention, the module Z6 uses growing media beds where the productivity is much higher and where the benefits of the bags like to prevent contact of the roots of the plants with the soil strata can be realized at much lower cost. A thermal sheet is fixed to the surfaces of the bottom ends of the growing media beds at about 30 centimeters depth and about 30 centimeters along four internal vertical sides with about 7 centimeters overlap on horizontal surfaces of four external sides. The bottom end surface of growing media beds is provided with another layer of a film which is provided holes for leachate drain off and in between the two layers are provided plastic perforated pipes. Pressurized hot air of a defined temperature is injected into the pipes during each drip dosing irrigation and drip dosing fertigation event for:
  i) aerating the roots of the plants,
  ii) maintaining the temperature of the roots of the plants at a defined temperature point which helps in efficient uptake of nutrients, and
  iii) facilitating switching-off the drip dosing irrigation or drip dosing fertigation event on first few drops of drained off leachate for facilitating optimal watering and nutrition without any danger of plants collapsing due to water logging which is very beneficial in general and in Hydroponics in particular. The best method is to use diluted activated nutrients solutions which further increases use efficiency and obviate separate irrigation and fertigation.

Similar benefits can also be derived in a growing media bags system where a thermal tube having a width equal to $3/4^{th}$ width of the growing media bag is placed under the rows of the bags. The upper surface of the tube is provided holes for leachate drain off. Plastic perforated pipes are provided at the center of the tube in between the two layers.

According to a twelfth embodiment of the present invention, the module Z6 melts snow on the exterior surfaces of the film covering the greenhouse by equipping the greenhouse with a heating manifold. When the atmospheric air temperature sensor senses that the atmospheric air temperature is approaching 0° C., it switches-on the heating manifold for injecting hot air onto the interior surfaces of the film fixed to the greenhouse roof, and to the four external sides of the greenhouse for melting snow.

According to a thirteenth embodiment of the present invention, the module Z7 comprises a film fixed to the greenhouse roof and to the four external sides of the greenhouse together with 0 to 100% roll-on-close and roll-off-open automated thermal and shading curtains on the greenhouse ceiling and on the four internal sides of the greenhouse. It will be appreciated that the thermal and shading curtains are the curtains that provides both thermal insulation and shade. The interior and exterior surfaces of the thermal and shading curtains function as solid barriers between the greenhouse air temperature and relative humidity environment and the atmospheric air temperature and relative humidity environment. The interior surfaces the curtains absorb and retain the greenhouse warm or cool air trying to escape into the atmosphere, and the exterior surfaces of the curtains absorb and retain the atmospheric cold or hot air trying to enter into the greenhouse.

The heat energy accumulated on the interior surfaces of the curtains on the greenhouse ceiling and on the interior surfaces of the curtains on the four internal sides of the greenhouse, saves substantial heating cost and helps to prevent the greenhouse air from cooling down. During the winter, cold evenings, nights and mornings the greenhouse remains warm and there is little chance of moisture condensation or mist formation on the interior surfaces of the film covering the greenhouse.

Sunlight energy and heat energy being linked, in the hot locations during sunlight hours, when the greenhouse air temperature is higher than a defined temperature point, the greenhouse air temperature sensor switches-on the greenhouse solar radiation sensor to provide shade by rolling-on the 0 to 100% roll-on-close and roll-off-open automated thermal and shading curtains on the greenhouse ceiling and, or on the four internal sides of the greenhouse, thereby allowing into the greenhouse only a defined deficient amount of solar radiation for:
  i) minimizing the needless heat gain, and
  ii) minimizing the greenhouse supplementary cooling cost.

In the cold locations, commencing sunrise until sunset, the greenhouse solar radiation sensor maintains switched-off the curtains on the greenhouse ceiling and on the four internal sides of the greenhouse for:
  i) maximizing heat gain, sensible and latent, and
  ii) minimizing the greenhouse supplementary heating cost.

In the hot locations, during early morning sunrise, overcast sky hours, at sunset, and as and when solar radiation into the greenhouse is less than the defined solar radiation point, the atmospheric solar radiation sensor, maintains switched-on the curtains on the greenhouse ceiling and on the four internal sides of the greenhouse for minimizing heat gain for reducing the greenhouse supplementary cooling cost.

Thus the 0 to 100% roll-on-close and roll-off-open automated thermal and shading curtains substantially reduce the greenhouse supplementary heating cost in the cold locations, and the greenhouse supplementary cooling cost in the hot locations, and provides an all in one solution for all the seasons and in all the locations.

After sunset or after the defined photoperiod hours, the atmospheric solar radiation sensor switches-on the curtains on the greenhouse ceiling and on the four internal sides of the greenhouse.

According to a fourteenth embodiment of the present invention, the module Z7 increases deficient artificial lighting to be sufficient for food production in the greenhouse. This reduces capital and operating cost by reducing the electric energy required for artificial lighting, and require installation of fewer lights. The module Z7 also increases deficient sun light energy to be sufficient in the greenhouse for food production.

Artificial lighting comprises Fluorescent tubes and CFL lamps in mirror shades. The fluorescent tubes and CFL lamps are installed staggered around a horizontal width center of rows of growing media beds or bags. at the defined square meters centers, and are hung from a bottom of a truss at defined elevations above tops of the plants. The fluorescent tubes and the CFL lamps may be raised as the plants grow in height. The fluorescent tubes can be alternately red, blue and white.

The module Z7 also increases deficient sunlight into the greenhouse to be sufficient for food production in the locations wherein sunlight energy is not deficient but is reduced due to dust and dirt accumulation on the exterior surfaces of the film covering the greenhouse and, or due to condensation or mist formation on the interior surfaces of the film covering the greenhouse.

The sunlight is increased by equipping the greenhouse with mirrors and aluminum foil. These mirrors and aluminum foil are installed at the exterior surfaces of the rows of the growing media beds or bags at defined square meters centers. Incoming sunlight (or artificial light striking mirrors, lamp shades and aluminum foil) is reflected to the other mirrors, lamp shades and aluminum foil, to increase the light by repeated light reflecting cycles and to produce red, blue and white light. The mirrors and aluminum foil also spread light more uniformly.

According to a fifteenth embodiment of the present invention, the module Z7 facilitates food production in the cold locations, wherein life exists but is very sunlight deficient. This is achieved by increasing deficient sunlight energy together with artificial lighting energy to be sufficient for food production using the earth tube heat exchanger together with the bio-thermal energy harnessing automated equipment.

According to a sixteenth embodiment of the present invention, the module Z7 facilitates efficient integrated pest management by covering the greenhouse with a film fixed to the greenhouse roof and to the four external sides of the greenhouse such that the greenhouse efficiently prevents ingress of insect pests, pathogens and the like into the greenhouse facilitating efficient biological control.

According to a seventeenth embodiment of the present invention, the module Z7 eliminates the need for gutters in a multi span structured greenhouse. As such, this eliminates problems related to the gutters such as:
a) blocking of incoming sunlight into the greenhouse,
b) condensation or mist on the interior surfaces of the gutters,
c) water drops dripping on to the plants causing injury to the plants,
d) snow accumulation in the gutters,
e) very heavy down pour of rain overflowing on the multi span structured greenhouse roofs, along the sides and into the greenhouse, causing damage to the plants inside,
f) dust and dirt accumulation in the gutters, and
g) algae or fungi growth in the gutters.

According to an eighteenth embodiment of the present invention, the module Z7 further maintains optimal insulation between two layers of inflated double layer greenhouse cover film which is critical for increased thermal efficiency, and for reducing the heat loss and the associated thermal energy cost. The total area of a double layer greenhouse cover film is divided into alternate horizontal and vertical segments of about 2 square meters and of about 3 square meters respectively. Thermal sealing is completed after each segment is inflated to ensure that the segment which is being inflated is fully insulated from all other adjoining segments. Leaking segment can be visually identified and easily repaired.

According to a nineteenth embodiment of the present invention, the module Z7 also comprises a method to employ smaller wall thickness, smaller diameter, cheaper galvanized iron pipes filled with sand. The ends of the pipes are sealed so that the sand cannot escape. These pipes replace the large wall thickness C-class, large diameter costly galvanized iron pipes for weighting down the curtains, the screens and the like to keep them tightly in place and to prevent them from blowing in the wind. They both serve the same objective thus, considerable cost is saved.

The above description is to understand the invention and in no way to limit the scope of the invention which is amendable to various modifications and improvements within the scope of the present invention which will be evident to those skilled in the art. The present invention is not restricted to the greenhouse applications only.

The invention claimed is:

1. An environmentally controlled greenhouse having a roof, the greenhouse comprising:
   a capture manifold for capturing a carbon dioxide rich greenhouse air during dark hours and an oxygen rich greenhouse air during sunlight hours;
   a compressor for compressing the captured carbon dioxide rich and oxygen rich greenhouse air;
   a first tank (T1) and a second tank (T2) for dehumidifying, or for maintaining relatively dry, the compressed carbon dioxide rich and oxygen rich greenhouse air;
   a release manifold for releasing into the greenhouse at cultivation level, the dehumidified or relatively dry carbon dioxide rich greenhouse air during the sunlight hours, and the dehumidified or relatively dry oxygen greenhouse air during the dark hours;
   a third tank (Ta) for storing and dehumidifying compressed atmospheric air for release into the greenhouse to maintain a balance between carbon dioxide and oxygen;
   an earth tube heat exchanger comprising a first compartment (Ec) for storing the dehumidified carbon dioxide rich greenhouse air, a second compartment (Eo) for storing the dehumidified oxygen rich greenhouse air, a third compartment (Ecd) for storing the relatively dry carbon dioxide rich greenhouse air, and a fourth compartment (Eod) for storing the relatively dry oxygen rich greenhouse air, wherein, in relatively cold weather geographical locations, the earth tube heat exchanger conditions relatively cooler greenhouse air to relatively warmer greenhouse air and, in relatively hot weather geographical locations, the earth tube heat exchanger conditions relatively warmer greenhouse air to relatively cooler greenhouse air,
   and wherein the earth tube heat exchanger maintains the greenhouse air temperature at a predetermined temperature set point which is equal to an average thermal constant temperature of the geographical location of the greenhouse; and
   a carbon dioxide sensor,
   wherein when the content of carbon dioxide in the greenhouse is higher than a predetermined carbon dioxide content set point due to carbon dioxide released by the plants during the dark hours or due to residual carbon dioxide available after carbon dioxide enrichment events during the sunlight hours, the greenhouse carbon dioxide sensor switches on the capture manifold, the compressor, the first tank (T1), the second tank (T2), the release manifold, the third tank (Ta), and the earth tube heat exchanger, and the capture manifold captures the carbon dioxide rich greenhouse air, the compressor compresses the captured carbon dioxide rich greenhouse air, the compressed carbon dioxide rich greenhouse air is dehumidified in the first and second tanks (T1) and (T2), the carbon dioxide rich dehumidified greenhouse air is stored into the first compartment (Ec) and the release manifold releases into the greenhouse, at a cultivation level, the oxygen rich dehumidified conditioned greenhouse air stored in the second compartment (Eo) for maintaining the greenhouse carbon dioxide content at the predetermined carbon dioxide content set point which is equal to the content of carbon dioxide in the atmosphere, and wherein the greenhouse reduces global warming by preventing the greenhouse carbon dioxide from being released into the atmosphere by capturing, compressing, dehumidifying, storing and utilizing the greenhouse carbon dioxide for enrichment during the sunlight hours for maximizing the yield of plants growing in the greenhouse and for maintaining the greenhouse carbon dioxide content at the predetermined carbon dioxide content set point that is equal to the atmospheric carbon dioxide content.

2. The greenhouse of claim 1, further comprising a heating manifold for melting snow on exterior surfaces of a film covering the roof of the greenhouse, wherein the greenhouse further comprises a weather station comprising (i) an atmospheric solar radiation sensor, (ii) an atmospheric air temperature sensor and (iii) a rain detector, wherein when the atmospheric air temperature sensor senses that the atmospheric air temperature is approaching 0° C., the atmospheric air temperature sensor switches on pressurized hot air injections into the heating manifold to heat the interior surfaces of the film for melting snow on the exterior surfaces of the film.

3. The greenhouse of claim 1, wherein each of the first tank (T1), the second tank (T2), and the third tank (Ta) comprises a moisture drain off valve for draining off moisture from each of the first tank (T1), the second tank (T2), and the third tank (Ta) wherein the moisture drain off valves are switched on by a greenhouse air relative humidity sensor.

4. The greenhouse of claim 1, wherein bio-thermal energy is harnessed for supplementary heating of the greenhouse in relatively cold weather geographical locations using automated equipment comprising the following components:
  two bio-thermal energy harnessing tanks;
  a first fresh dosing tank;
  a second spent dosing tank;
  a hot air storing tank; and
  a carbon dioxide storing tank,
wherein the components function with the compressor for providing pressurized air and with a water transfer pump for providing pressurized water for harnessing the bio-thermal energy.

* * * * *